United States Patent
Han et al.

(10) Patent No.: US 12,404,610 B2
(45) Date of Patent: Sep. 2, 2025

(54) MXENE FIBERS AND PREPARATION METHOD THEREOF

(71) Applicant: IUCF-HYU (INDUSTRY-UNIVERSITY COOPERATION FOUNDATION HANYANG UNIVERSITY), Seoul (KR)

(72) Inventors: Tae Hee Han, Namyangju-si (KR); Won Sik Eom, Seoul (KR); Sang Hoon Lee, Yongin-si (KR); Hwan Soo Shin, Seoul (KR); Woo Jae Jeong, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 459 days.

(21) Appl. No.: 17/784,840

(22) PCT Filed: Dec. 16, 2020

(86) PCT No.: PCT/KR2020/018472
§ 371 (c)(1),
(2) Date: Jun. 13, 2022

(87) PCT Pub. No.: WO2021/125798
PCT Pub. Date: Jun. 24, 2021

(65) Prior Publication Data
US 2022/0411971 A1 Dec. 29, 2022

(30) Foreign Application Priority Data
Dec. 19, 2019 (KR) .................. 10-2019-0171203
Dec. 16, 2020 (KR) .................. 10-2020-0176009

(51) Int. Cl.
*D01F 9/08* (2006.01)
*C09C 1/40* (2006.01)
(Continued)

(52) U.S. Cl.
CPC .................. *D01F 9/08* (2013.01); *C09C 1/40* (2013.01); *C09C 3/006* (2013.01); *C09C 3/04* (2013.01);
(Continued)

(58) Field of Classification Search
None
See application file for complete search history.

(56) References Cited

U.S. PATENT DOCUMENTS

| 10,683,208 B2 | 6/2020 | Shin et al. | |
| 2021/0262121 A1* | 8/2021 | Kim | D01D 5/06 |
| 2022/0025554 A1* | 1/2022 | Kim | D01D 5/06 |

FOREIGN PATENT DOCUMENTS

| CN | 107938026 A | * | 4/2018 | ............... D01D 5/06 |
| KR | 10-2017-0036507 A | | 4/2017 | |
| KR | 10-2019-0098082 A | | 8/2019 | |

OTHER PUBLICATIONS

Jizhen Zhang, Shayan Seyedin, Si Qin, Zhiyu Wang, Sepehr Moradi, Fangli Yang, Peter A. Lynch, Wenrong Yang, Jingquan Liu, Xungai Wang, and Joselito M. Razal. "Highly Conductive Ti3C2Tx MXene Hybrid Fibers for Flexible and Elastic Fiber-Shaped Supercapacitors." Small 2019, 15, 1804732. Pub. Jan. 17, 2019. (Year: 2019).*

(Continued)

*Primary Examiner* — Marla D McConnell
*Assistant Examiner* — Kevin Worrell
(74) *Attorney, Agent, or Firm* — NKL Law; Jae Youn Kim

(57) ABSTRACT

MXene fibers and a preparation method thereof are provided. The method for preparation of a MXene fiber com-
(Continued)

prises preparing a dope solution in which MXene sheets are dispersed in a polar solvent, extruding the dope solution into a coagulating solution to coagulate the extruded dope solution to change into a MXene gel fiber, and drying the MXene gel fiber and converting it into the MXene fiber.

16 Claims, 22 Drawing Sheets

(51) Int. Cl.
    *C09C 3/00*     (2006.01)
    *C09C 3/04*     (2006.01)
    *C09C 3/06*     (2006.01)
    *D01D 5/06*     (2006.01)
    *D01D 10/02*     (2006.01)

(52) U.S. Cl.
    CPC ............... *C09C 3/063* (2013.01); *D01D 5/06* (2013.01); *D01D 10/02* (2013.01); *C01P 2004/20* (2013.01); *D10B 2101/14* (2013.01); *D10B 2401/061* (2013.01); *D10B 2401/16* (2013.01)

(56)     References Cited

OTHER PUBLICATIONS

Shayan Seyedin, Elliard Roswell S. Yanza and Joselito M. Razal. "Knittable energy storing fiber with high volumetric performance made from predominantly MXene nanosheets." J. Mater. Chem. A, 2017, 5, 24076. DOI: 10.1039/c7ta08355f. (Year: 2017).*

Levitt, Ariana S. et al., "Electrospun MXene/Carbon Nanofibers as Supercapacitor Electrodes", Journal of Materials Chemistry A, Nov. 27, 2018, vol. 7, pp. 269-277.

Sobolciak, Patrik et al., 2D Ti3C2Tx (MXene)-reinforced polyvinyl alcohol (PVA) nanofibers with enhanced mechanical and electrical properties. PLoS One, Aug. 30, 2017, vol. 12, No. 8, pp. 1-18.

* cited by examiner

MXENE FIBERS AND PREPARATION METHOD THEREOF

TECHNICAL FIELD

The present invention relates to fibers and more particularly to MXene fibers.

BACKGROUND ART

As a conventional two-dimensional material capable of forming fibers, there is a nano-carbon-based material such as graphene. Graphene is a carbon allotrope having a two-dimensional structure in which carbon atoms form a hexagonal honeycomb lattice structure by $sp^2$ hybridization, and the thickness of single-layer graphene is 0.2 to 0.3 nm, which is the thickness of one carbon atom. Graphene has high electrical conductivity and specific surface area, so it is used in various fields such as an electrode (electrode active material) for supercapacitors, sensors, batteries, actuators, touch panels, flexible displays, high-efficiency solar cells, heat dissipation films, coating materials, seawater desalination filters, electrode for secondary batteries, and ultra-fast chargers, and a method for manufacturing fibers using graphene is being developed.

Such graphene fibers are manufactured through a wet spinning method. The graphene fibers formed using such a wet spinning method have limitations in improving electrical conductivity, and therefore it is known that heat treatment close to 2000 degrees is required to significantly improve the electrical conductivity of graphene fibers.

DISCLOSURE

Technical Problem

An object of the present invention is to provide a fiber including a two-dimensional material exhibiting high electrical conductivity.

The objects of the present invention are not limited to the above-mentioned objects, and other objects not mentioned will be clearly understood by those skilled in the art from the following description.

Technical Solution

One aspect of the present invention provides a method for manufacturing a MXene fiber. The method comprises preparing a dope solution in which MXene sheets are dispersed in a polar solvent, extruding the dope solution into a coagulating solution to coagulate the extruded dope solution to change into a MXene gel fiber, and drying the MXene gel fiber and converting it into the MXene fiber.

The dope solution may have a concentration of 13 to 29 mg/ml. The MXene sheets may have an average area of several $\mu m^2$. The MXene sheet may be a transition metal carbide or transition metal nitride sheet to which at least one terminal group selected from the group consisting of F, OH, and O is bonded on the surface.

The coagulating solution may be a solution containing a cation as a coagulant. The cation may be $Li^+$, $Na^+$, $K^+$, $Mg^{2+}$, $Ca^{2+}$, $Cu^{2+}$, $Co^{2+}$, $Al^{3+}$, or $Fe^{3+}$. The cation may be an ammonium ion. The coagulating solution may contain water, alcohol, or a mixed solvent of water and alcohol. The MXene sheet may be a sheet on which at least one surface functional group selected from the group consisting of F, OH, and O is bonded on the surface, the cation may electrostatically bind the surface functional groups of the MXene sheets in the MXene gel fiber to form a cross-linkage between the MXene sheets.

The dope solution may contain only MXene sheets as two-dimensional material sheets.

Another aspect of the present invention provides an MXene fiber. The MXene fiber comprises a plurality of MXene sheets. The MXene sheets may be laminated in a tortuous state in the thickness direction of the fiber, the faces of the MXene sheets may be oriented in the longitudinal or axial direction of the fiber, and the MXene sheets may be continuous in the longitudinal or axial direction of the fiber.

The MXene sheet may be a sheet on which at least one surface functional group selected from the group consisting of F, OH, and O is bonded on the surface. The MXene fiber further comprises cations forming cross-linkages between the MXene sheets by electrostatically binding the surface functional groups of the MXene sheets. The cation may be an ammonium ion.

An interplanar distance between the MXene sheets in the MXene fiber may be 10 to 20 Å. The center of the peak obtained on the XRD graph for the MXene fiber represents a value of $2\theta$ of 6 to 6.5°. The electrical conductivity of the MXene fiber may be several thousands S/cm. The Young's modulus of the MXene fiber may be several tens GPa. The diameter of the MXene fibers may be micrometer size.

ADVANTAGEOUS EFFECTS

According to embodiments of the present invention, it is possible to provide a fiber including a two-dimensional material exhibiting high electrical conductivity.

In addition, the fiber may exhibit excellent mechanical strength while including only the MXene sheet as a two-dimensional material.

However, the effects of the present invention are not limited to the above-mentioned effects, and other effects not mentioned will be clearly understood by those skilled in the art from the following description.

MODES OF THE INVENTION

Hereinafter, exemplary embodiments of the present invention will be described in detail with reference to the accompanying drawings in order to describe the present invention in more detail. However, the invention is not limited to the embodiments described herein and may be embodied in other forms.

Throughout this specification, when a part "includes" a certain component, it means that other components may be further included, rather than excluding other components, unless otherwise stated.

As used throughout this specification, the terms "about", "substantially" and the like are used to indicate a range close to the stated value, taking into account tolerances, and are used to prevent unconscionable infringers from unfairly using the exact or absolute value stated to aid the understanding of the present application.

Figure 1:
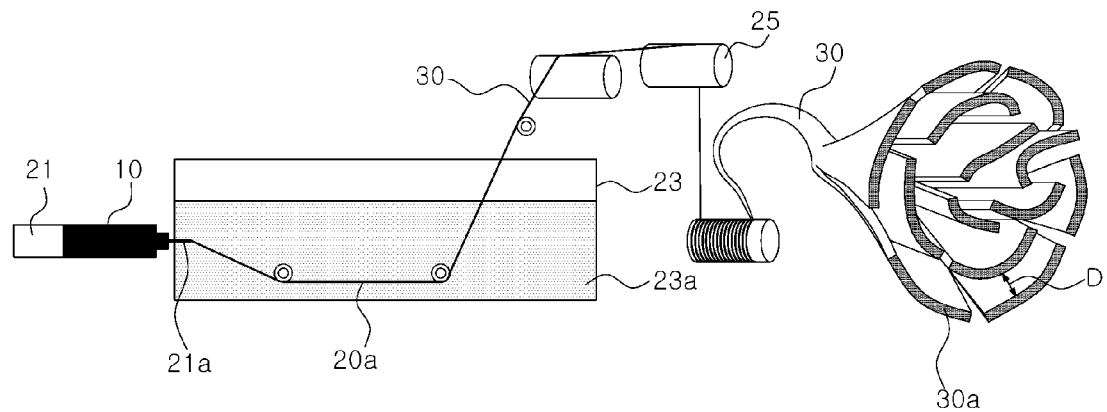
FIG. 1 is a schematic view showing an apparatus for forming MXene fibers by extruding a dope solution into a coagulation bath according to an embodiment of the present invention.
Figure 2:
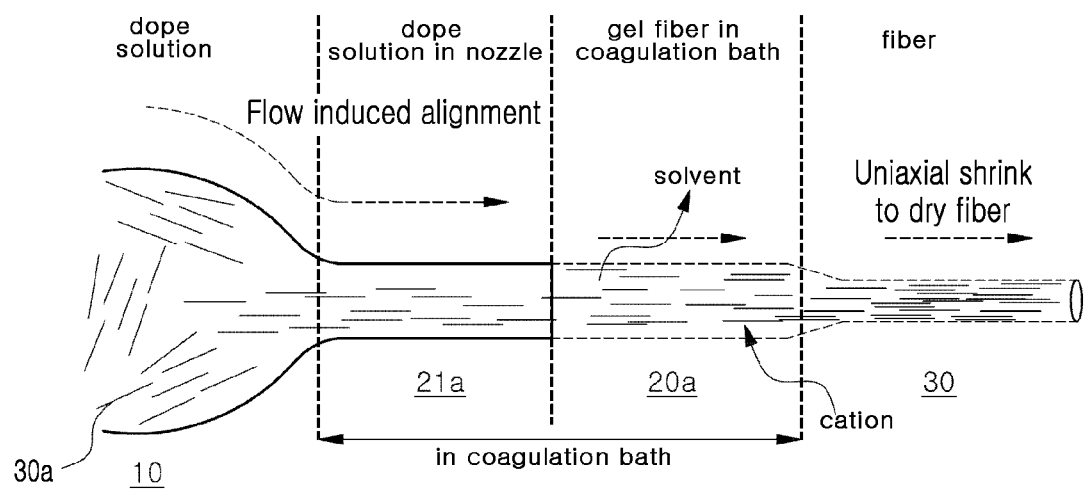
FIG. 2 is a schematic diagram showing the process of changing a dope solution into MXene fibers according to an embodiment of the present invention.
Figure 3:
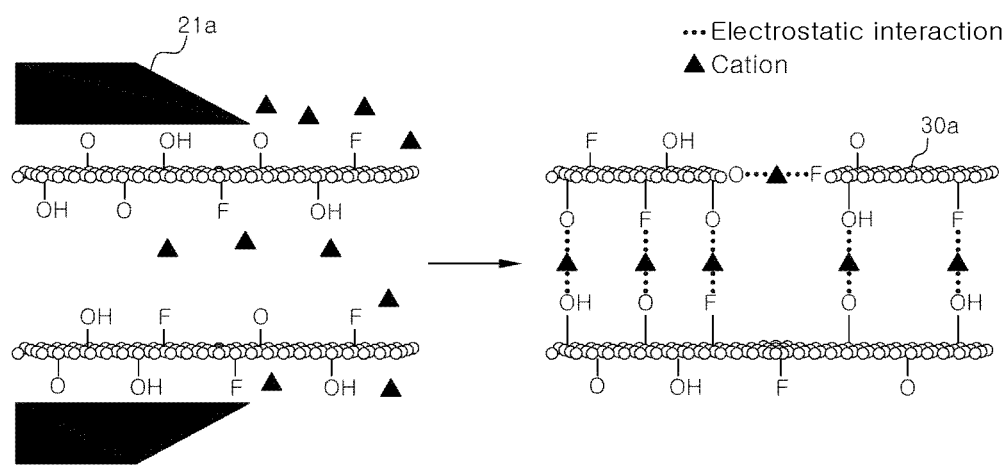
FIG. 3 is a schematic diagram illustrating a process of forming MXene gel fibers in a coagulating solution according to an embodiment of the present invention.

FIG. 1 is a schematic view showing an apparatus for forming MXene fibers by extruding a dope solution into a coagulation bath according to an embodiment of the present invention, and FIG. 2 is a schematic diagram showing the process of changing a dope solution into MXene fibers according to an embodiment of the present invention. FIG. 3 is a schematic diagram illustrating a process of forming MXene gel fibers in a coagulating solution according to an embodiment of the present invention.

According to FIGS. 1, 2, and 3, a dope solution 10 is provided.

The dope solution 10 may be an MXene dispersion including MXene, specifically, MXene sheets 30a. The solvent in the MXene dispersion may be a polar solvent, for example, water. The dope solution 10, which is the MXene dispersion, in which the MXene sheets 30a may be dispersed in the solvent, and may be in a colloidal dispersion state. The dope solution 10 may have a concentration of, for example, 5 to 40 mg/ml, 10 to 35 mg/ml, 12 to 30 mg/ml, 13 to 29 mg/ml, or 15 to 25 mg/ml. A solute in the dope solution 10, specifically, two-dimensional material sheets may all be the MXene sheets 30a.

The MXene sheet 30a may be a two-dimensional transition metal carbide or transition metal nitride sheet. The MXene sheet 30a may be one in which one to several MXene unit layers are stacked. In this case, the several layers may mean 2 to 5 layers. In this case, the MXene sheet 30a may have a thickness in the range of 1 to several nm. In addition, the MXene sheets 30a may have an area of about 0.1 to 100 μm², specifically, a relatively large average area of about several μm², for example, 2 to 8 μm², 3 to 7 μm², 4 to 6 μm², or 5 to 5.5 μm². In addition, the MXene sheets 30a may have an average size of several μm, for example, about 1 to 5, 1.5 to 3, specifically, 2 to 2.5 μm.

The MXene unit layer may be a transition metal carbide or transition metal nitride represented by $M_{1.33}XT_z$ or $M_{n+1}X_nT_z$ (n=1, 2, or 3). In this case, M is a transition metal, X may be carbon or nitrogen, $T_z$ may be F, OH, and/or O as a plurality of various surface functional groups, and z may be an integer of 1 to 4. The transition metal (M) may specifically include Nb, Mo, W, Ti, V, Y, Zr, Hf, Cr, Sc, Ta, or two or more of these.

Among these MXene unit layers, $M_{n+1}X_nT_z$ (n=1, 2, or 3) may have a structure in which the carbon or nitrogen layer (X), specifically a carbon or nitrogen atom layer, is interposed between the transition metal layers (M) adjacent to each other among 2 to 4 transition metal layers specifically transition metal atomic layers (M) and is covalently bonded to the transition metal. The transition metal layer may include one transition metal or two or more different transition metals. Alternatively, the stacked transition metal layers may be the same transition metal layers or different transition metal layers. In addition, all of the stacked carbon or nitrogen layers (X) may be carbon layers or nitrogen layers, or some layers may be carbon layers and the remaining layers may be nitrogen layers. $M_{1.33}X$ may be $Nb_{1.33}C$, $Mo_{1.33}C$, or $W_{1.33}C$. $M_{n+1}X_n$ (n=1) may be $Ti_2C$, $V_2C$, $Nb_2C$, $Mo_2C$, $Ti_2N$, $V_2N$, $Mo_2N$, $(Ti_{0.5}Nb_{0.5})_2C$, $(Ti_{0.5}V_{0.5})_2C$, or $(Mo_{2/3}Y_{1/3})_2C$. $M_{n+1}X_n$ (n=2) may be $Ti_3C_2$, $Ti_3CN$, $Zr_3C_2$, $Hf_3C_2$, $(Ti_{0.5}V_{0.5})_3C_2$, $(Cr_{0.5}V_{0.5})_3C_2$, $(Cr_{2/3}Ti_{1/3})_3C_2$, $(Mo_{2/3}Sc_{1/3})_3C_2$, $Mo_2TiC_2$, or $Cr_2TiC_2$. $M_{n+1}X_n$ (n=3) may be $Ti_4N_3$, $V_4C_3$, $Nb_4C_3$, $Ta_4C_3$, $(Nb_{0.8}Ti_{0.2})_4C_3$, $(Nb_{0.8}Zr_{0.2})_4C_3$, $(Mo_{0.5}Ti_{0.5})_4C_3$, or $Mo_2Ti_2C_3$. As an example, the MXene unit layer may be $Ti_3C_2T_z$.

The MXene sheets 30a may be obtained by etching an A layer from a material having a MAX phase, that is, a material having a structure in which the A layer specifically an A atomic layer is interposed between $M_{1.33}X$ unit layers or $M_{n+1}X_n$ unit layers, and then exfoliating the obtained resultant. A may be Al. In this case, the etching may be performed using HF, LiF, NaF, KF, $NH_4F$, or $NH_4NF_2$ as an example of an acid containing fluorine. For example, the etching may be performed using a LiF/HCl mixed solution. In the exfoliation process, the resultant obtained by the etching may be washed with excess deionized water, centrifuged, and deionized water is added to the supernatant obtained in the centrifugation process, followed by another centrifugation, and repeating the process a plurality of times.

After that, MXene with an appropriate average area can be isolated. To this end, the supernatant obtained in the centrifugation for exfoliation, that is, the MXene dispersion, may be centrifuged again to obtain another supernatant, and the supernatant may be centrifuged at a higher rpm compared to the previous centrifugation, and the obtained supernatant may be discarded to remove too small debris of MXene sheets and obtain the part below the supernatant, that is, an aqueous dispersion of MXene, where the MXene concentration is higher than the supernatant. Through this method, the MXene sheets 30a in the MXene aqueous dispersion may have a relatively large average area of about 0.1 to 100 $\mu m^2$, specifically, an average area of about several $\mu m^2$, that is, an average area of 1 to 10 $\mu m^2$, for an example, 2 to 8 $\mu m^2$, or 3 to 6 $\mu m^2$. In addition, the MXene sheets 30a in the MXene aqueous dispersion may have an average size from several hundreds of nm to several tens of specifically, from 1 to 10 for example, about 1 to 5, specifically 2 to 4 $\mu m$.

When the dope solution 10 is an MXene organic dispersion containing an organic solvent other than water, after the MXene aqueous dispersion is obtained, and water in the MXene aqueous dispersion may be exchanged with the organic solvent to obtain the MXene organic dispersion.

Surface functional groups Tz having a negative charge, for example, F, OH, and/or O may be located on the surface of the MXene sheet 30a in the dope solution 10. Accordingly, when a solvent in the dope solution 10 is a polar solvent, the dope solution 10 may be in a colloidal dispersion state where the MXene sheets 30a are uniformly dispersed without agglomeration.

Additionally, the dope solution 10 may further contain additives such as dyes, cryoprotectants, antioxidants, cross-linking agents, ultraviolet absorbers, surfactants, reducing agents, or pH adjusting agents. These additives may be contained in an amount of 0.05 to 2 wt % based on the weight of MXene.

The dope solution 10 may be located in an extruder 21 having a spinning nozzle 21a. Thereafter, the dope solution 10 may be spun into a coagulating bath 23 with a coagulating solution 23a through the extruder 21. The spinning speed may be 0.8 to 1.5 m/min. When the dope solution 10 passes through the spinning nozzle 21a, the MXene sheets may be aligned in the spinning direction due to the fluid flow.

The coagulating solution 23a may be a solution containing cations, specifically, metal or non-metal cations as a coagulant. In this case, the metal cation may be a monovalent, divalent, or trivalent metal cation, for example, $Li^+$, $Na^+$, $K^+$, $Mg^{2+}$, $Ca^{2+}$, $Cu^{2+}$, $Co^{2+}$, $Al^{3+}$, or $Fe^{3+}$. The non-metal cation may be an ammonium ion. The ammonium ion may be any one of $NH^{4+}$ or primary to quaternary ammonium ions. Primary to quaternary ammonium ions may be represented by $R_1NH_3^+$, $R_1R_2NH_2^+$, $R_1R_2R_3NH^+$, $R_1R_2R_3R_4N^+$, wherein $R_1$, $R_2$, $R_3$, and $R_4$ may be an alkyl group having 1 to 20 carbon atoms, for example, a C1 to C4 alkyl group regardless of each other. As an example, primary to quaternary ammonium ions may be $(CH_3)NH_3^+$, $(CH_3)_2NH_2^+$, $(CH_3)_3N^+$, $(CH_3)_4N^+$, $(CH_3CH_2)NH_3^+$, $(CH_3CH_2)_2NH_2^+$, $(CH_3CH_2)_3NH^+$, $(CH_3CH_2)_4N^+$, $(CH_3CH_2CH_2)NH_3^+$, $(CH_3CH_2CH_2)_2NH_2^+$, $(CH_3CH_2CH_2)_3NH^+$, $(CH_3CH_2CH_2)_4N^+$, $(CH_3CH_2CH_2CH_2)NH_3^+$, $(CH_3CH_2CH_2CH_2)_2NH_2^+$, $(CH_3CH_2CH_2CH_2)_3NH^+$, $(CH_3CH_2CH_2CH_2)_4N^+$, or $(CH_3(CH_2)_{15})(CH_3)_3N^+$. The cation may be added to the coagulating solution 23a in the form of a salt. The salt may include an anion, for example, halide, carbonate, phosphate, sulfate, chromate, formate, borate, or perchlorate in addition to the cation. The halide may be $F^-$, $Cl^-$, $Br^-$, or $I^-$.

The solvent in the coagulating solution 23a may be water, alcohol, or a mixed solvent of water and alcohol. The alcohol may be methanol, ethanol, propanol, or butanol. The concentration of the cations in the coagulating solution 23a may be 0.5 to 2 molar concentration (M), specifically, 0.7 to 1.5 molar concentration. In addition, the pH of the coagulating solution 23a may be 4 or more, specifically, the pH may be 5 to 12, more specifically, 6 to 11, which is neutral or basic, and 8 to 10, which is basic. The pH adjustment of the coagulating solution 23a can be performed by adding a pH adjusting agent. The pH adjusting agent may be aqueous ammonia, but is not limited thereto.

After the dope solution 10 is extruded from the spinning nozzle 21a, the cations in the coagulation bath 23a may be inserted between the MXene sheets 30a and the solvent between the MXene sheets 30a, which is the solvent in the dope solution 10, may be diffused out. The cations inserted between the MXene sheets 30a may bind anionic functional groups (O, F, or OH) on the surface of the adjacent MXene sheets 30a by electrostatic attraction to form bridges or cross-linkages between the MXene sheets 30a. As the dope solution 10 extruded from the spinning nozzle 21a is solidified by this process, MXene gel fibers 20a may be formed.

In particular, when the pH of the coagulating solution 23a is basic, the probability that the surface functional groups on the surface of the MXene sheets 30a exist in an anionic state increases, so that electrostatic interactions between the surface of the MXene sheets 30a and the cations in the coagulating solution 23a can be magnified. Accordingly, the MXene sheets 30a in the MXene gel fiber 20a can be more densely assembled.

Thereafter, the MXene gel fibers 20a can be wound up at a constant speed to separate them from the coagulation bath, and at the same time, the solvent remaining in the MXene gel fibers 20a can be vaporized, and as a result, the MXene fibers 30 can be formed. By controlling the winding speed of the MXene gel fiber 20a, the MXene gel fiber 20a can be drawn. Specifically, the stretching may proceed at a speed of 2.4 to 4.5 m/min. When the coagulating solution of the coagulation bath 23a is basic, the MXene gel fiber 20a may have sufficient strength and may be stretched about 2 to 3 times. Accordingly, the degree to which the MXene sheets are aligned along the axial direction of the fiber in the MXene gel fiber 20a and later in the MXene fiber 30, that is, the degree of orientation may be improved.

After separating the MXene gel fibers 20a from the coagulation bath, the MXene gel fibers 20a may be washed using a solvent in the coagulation bath, and then the washed MXene gel fibers 20a may be dried to form the MXene fibers 30. In the washing process, cations forming bridges between the MXene sheets 30a may also be at least partially or completely removed. The drying process may be performed in an atmosphere of 0 to 5% relative humidity. The dried MXene fiber 30 together with the MXene gel fiber 20a may be in a state in which a predetermined tension is applied by being guided by a guide roll. Accordingly, within the MXene fiber 30, the MXene sheets may be aligned along the axial direction of the fiber.

A plurality of MXene sheets 30a may be stacked in a tortuous state in a thickness direction of the fiber. In addition, the faces of the MXene sheets 30a are oriented in the longitudinal or axial direction of the fiber, but the centers of mass of each of the stacked MXene sheets 30a are irregularly arranged, so that a plurality of MXene sheets 30a may be continuously disposed in the longitudinal or axial direction of the fiber. All of the two-dimensional sheets included in the MXene fiber 30 may be MXene sheets 30a.

The diameter of the MXene fibers 30 is a micrometer size, for example 5 to 30 μm, 7 to 25 μm, 10 to 20 μm, for example, when not drawn, 12 to 17 μm, specifically, 13 to 15 μm, and when drawn, about 10 to 11 μm. The center of the peak obtained on an XRD graph for the MXene fiber 30 may represent a 2θ value of 5.5 to 9°, specifically 6 to 7°. The spacing between the MXene sheets 30a within the MXene fiber 30, that is, the interplanar spacing D, may be 2 to 50 Å, 5 to 40 Å, 7 to 30 Å, 10 to 20 Å, for example 12 to 17 Å or 13 to 15 Å. The porosity (%) of the MXene fiber 30 may be 5 to 50%, 10 to 40%, for example, 15 to 35% when not drawn, and 6 to 8% when drawn. The electrical conductivity of the MXene fiber 30 may be a value of several thousands to tens of thousands S/cm, for example, 1,000 to 25,000 S/cm, 2,000 to 9,000 S/cm, specifically, 3,500 to 8,500 S/cm when not drawn, and 9,000 to 13,000 S/cm when drawn. The Young's modulus of the MXene fiber 30 may be a value of several tens to several hundreds GPa, for example, 10 to 200 GPa, 15 to 130 GPa, specifically, when not drawn, 20 to 35 GPa, and further 22 to 30 GPa and, when drawn, 100 to 125 GPa.

The MXene fiber 30 may include some cations that bind surface functional groups of the MXene sheets 30a by electrostatic attraction to form cross-linkages between the MXene sheets 30a. However, the present invention is not limited thereto, and all cations may have been removed during the washing process.

Thereafter, the MXene fiber 30 may be heat-treated in an inert gas atmosphere. The inert gas atmosphere may be an argon atmosphere, and the heat treatment may be performed at 300 to 700° C., for example, 400 to 600° C., specifically, 450 to 550° C. In this heat treatment process, as some of the surface functional groups of the MXene sheets 30a are removed, the z value of the MXene sheets 30a may be reduced from $M_{n+1}X_nT_z$ (n=1, 2, or 3).

The center of the peak obtained on an XRD graph for the heat-treated MXene fiber 30 may represent a 2θ value of 8 to 9°. The spacing between the MXene sheets 30a in the heat-treated MXene fiber 30, that is, the interplanar distance D, may be 10 to 11 Å. Electrical conductivity of the heat-treated MXene fiber 30 may represent a value of 20,000 to 23,000 S/cm.

As described above, the MXene fiber 30 according to an embodiment of the present invention can be stably manufactured as a fiber even though the two-dimensional sheets constituting the fiber are all MXene sheets, and furthermore, it can exhibit excellent mechanical strength and electrical conductivity.

Experimental examples will now be presented to aid the understanding of the present invention, but they are intended merely to be illustrative, and the present invention is not limited by the following experimental examples.

<MXene Aqueous Dispersion>

MXene Aqueous Dispersion Preparation Examples 1 to 5

LiF (99.995%, Sigma-Aldrich Co. LLC) was put in an HCl aqueous solution (36 wt % in water, Junsei Chemical Co., Ltd) and stirred to prepare a LiF/HCl mixed solution. 2 g of $Ti_3AlC_2$ having the MAX phase was slowly added to the LiF/HCl mixed solution for 10 minutes, and then reacted at a constant temperature of 35° C. for 24 hours to selectively etch the Al layer from $Ti_3AlC_2$. The obtained reaction product was washed with excess deionized water and then centrifuged at 2500 rpm for 5 minutes. After centrifugation, the process of adding deionized water to the supernatant and centrifugation at 2500 rpm for 5 minutes was repeated three more times. The supernatant obtained here, i.e., the MXene dispersion, was centrifuged again at 2500 rpm for 1 hour to obtain a supernatant. After centrifuging the supernatant again, the obtained supernatant was discarded to remove small remnants of MXene, and an aqueous dispersion of MXene having a high concentration of an exfoliated MXene, that is, $Ti_3C_2T_z$ compared to the discarded supernatant was obtained. Here, aqueous dispersions of MXene were prepared to have various concentrations shown in Table 1 below.

MXene Aqueous Dispersion Comparative Example

An aqueous dispersion containing MXene, that is, $Ti_3C_2T_z$ sheets at a concentration of 25 mg/ml was prepared using the supernatant discarded after the final centrifugation in MXene aqueous dispersion Preparation Example 4.

TABLE 1

|  |  | Dope solution concentration (mg/ml) |
|---|---|---|
| MXene Fiber Preparation Example 1 | MXene aqueous dispersion Preparation Example 1 | 12 |
| MXene Fiber Preparation Example 2 | MXene aqueous dispersion Preparation Example 2 | 15 |
| MXene Fiber Preparation Example 3 | MXene aqueous dispersion Preparation Example 3 | 20 |
| MXene Fiber Preparation Example 4 | MXene aqueous dispersion Preparation Example 4 | 25 |
| MXene Fiber Preparation Example 5 | MXene aqueous dispersion Preparation Example 5 | 30 |

Figure 4A:
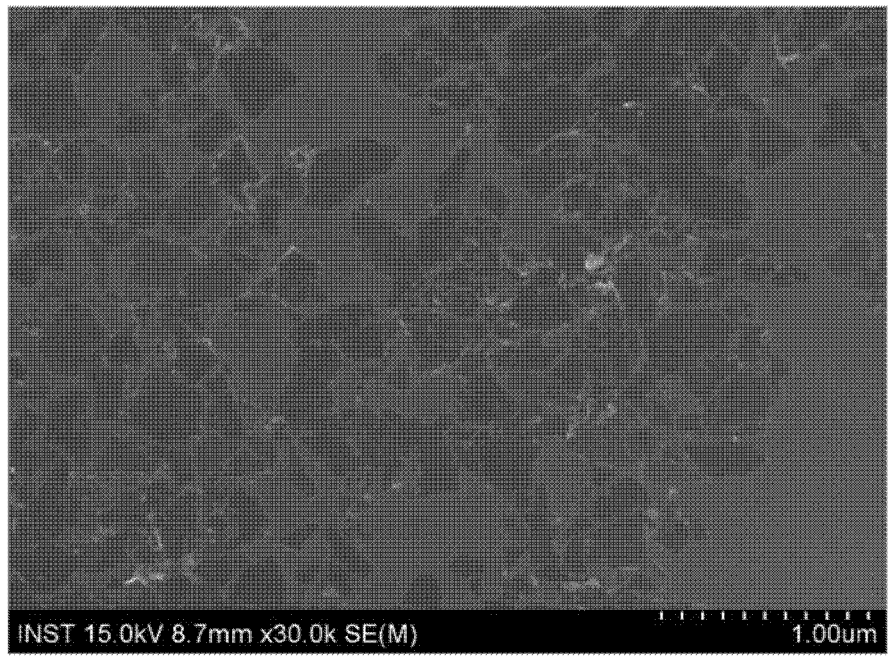
FIG. 4A is an SEM image of $Ti_3C_2T_z$ sheets obtained from MXene aqueous dispersion Preparation Example 1.
Figure 4B:
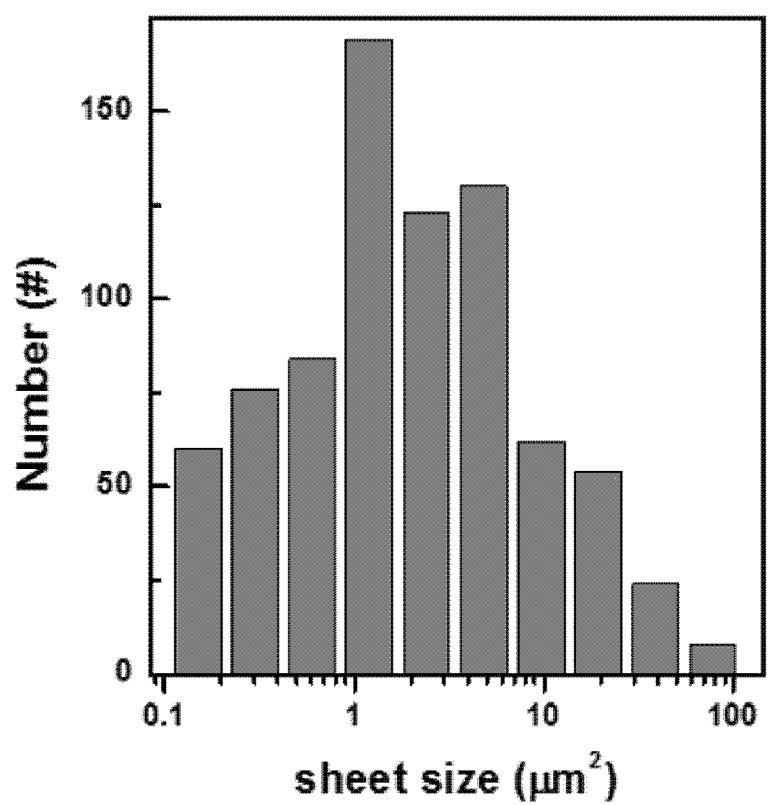
FIG. 4B is a graph showing the size distribution of $Ti_3C_2T_z$ sheets obtained from MXene aqueous dispersion Preparation Example 1.

FIG. 4A is an SEM image of $Ti_3C_2T_z$ sheets obtained from MXene aqueous dispersion Preparation Example 4, and FIG. 4B is a graph showing the size distribution of $Ti_3C_2T_z$ sheets obtained from MXene aqueous dispersion Preparation Example 4. Referring to FIGS. 4A and 4B, the $Ti_3C_2T_z$ sheets obtained from the MXene aqueous dispersion Preparation Example 4 were found to have an area of 0.1 to 100 μm², and the average area was found to be about 5.11 μm².

In addition, the $Ti_3C_2T_z$ sheets were estimated to have an average size of about 2.3 µm. Meanwhile, it was found that the $Ti_3C_2T_z$ sheets contained in the aqueous dispersion of MXene aqueous dispersion Comparative Example had an average size of about 426 nm.

Figure 5:
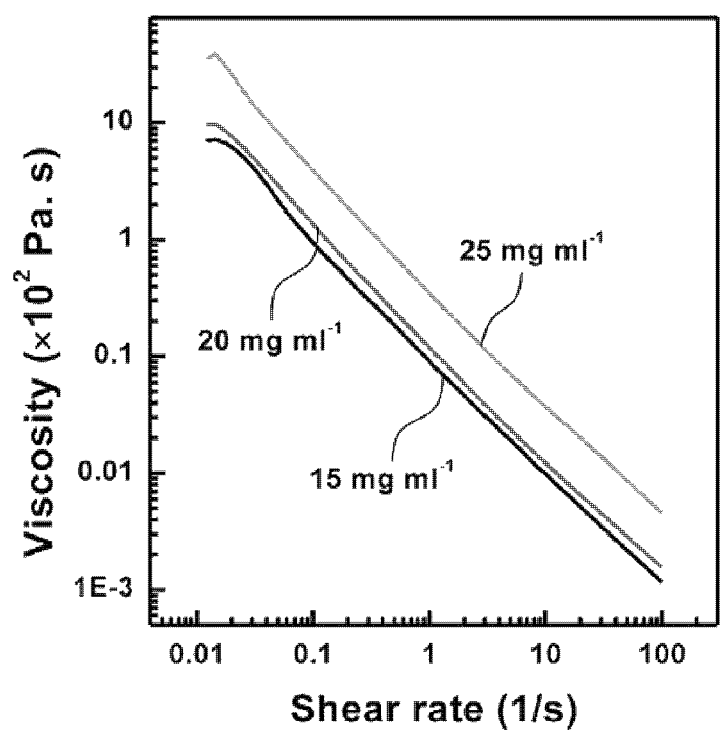
FIG. 5 is a graph showing the change in viscosity with respect to the shear rate of MXene aqueous dispersions obtained from MXene aqueous dispersion Preparation Examples 2 to 4.

FIG. 5 is a graph showing the change in viscosity with respect to the shear rate of MXene aqueous dispersions obtained from MXene aqueous dispersion Preparation Examples 2 to 4, and Table 2 below shows the viscosity of the aqueous dispersion according to each Preparation Example when the shear rate is $0.012\ s^{-1}$.

TABLE 2

|  | Dope solution concentration (mg/ml) | Viscosity @ shear rate of $0.012\ s^{-1}$ ($\times 10^2$ Pa·S) |
| --- | --- | --- |
| MXene aqueous dispersion Preparation Example 2 | 15 | 7.09 |
| MXene aqueous dispersion Preparation Example 3 | 20 | 9.65 |
| MXene aqueous dispersion Preparation Example 4 | 25 | 35.50 |

Referring to FIG. 5, it can be seen that the MXene aqueous dispersions obtained from MXene aqueous dispersion Preparation Examples 2 to 4 have increased viscosity when the MXene concentration is increased, and all exhibit shear thinning properties. Referring to FIG. 5 and Table 1, when the sheer rate is $0.012\ s^{-1}$, the viscosity of MXene aqueous dispersion of Preparation Example 2 (15 mg/ml) is $7.09 \times 10^2$ Pa·S, and the viscosity of MXene aqueous dispersion of Preparation Example 3 (20 mg/ml) is $9.65 \times 10^2$ Pa·S, so when the concentration increases by 5 mg/ml, the increase in viscosity is not large. However, considering the viscosity of MXene aqueous dispersion of Preparation Example 4 (25 mg/ml) is $35.5 \times 10^2$ Pa·S, it can be seen that the viscosity is significantly changed despite the increase in concentration of 5 mg/ml compared to MXene aqueous dispersion of Preparation Example 3. On the other hand, in the case of MXene aqueous dispersion of Preparation Example 5 having a concentration of 30 mg/ml, the concentration was so high that extrusion for fiber production was difficult.

Figure 6:
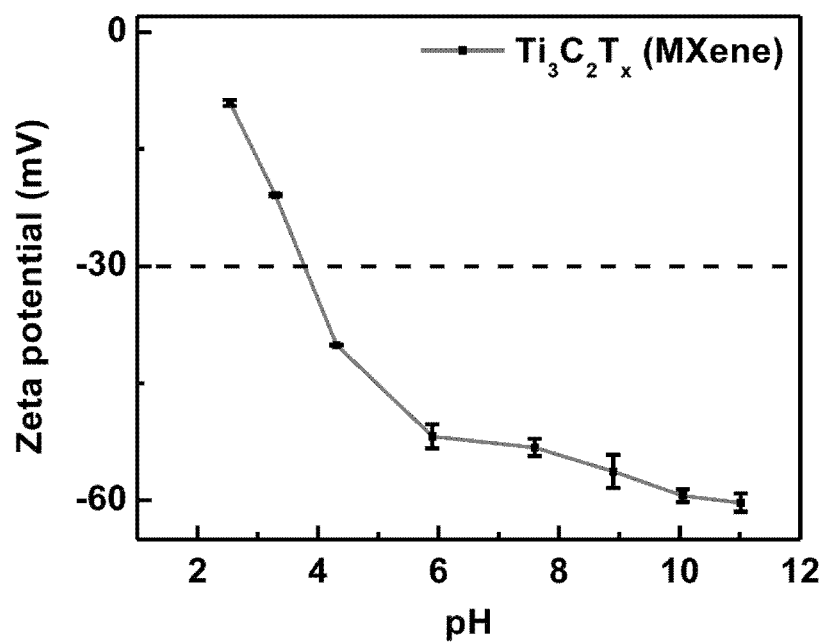
FIG. 6 is a graph showing the zeta potential according to the pH of the MXene aqueous dispersion obtained in MXene aqueous dispersion Preparation Example 4.

FIG. 6 is a graph showing the zeta potential according to the pH of the MXene aqueous dispersion obtained in MXene aqueous dispersion Preparation Example 4.

Referring to FIG. 6, considering that the zeta potential of the aqueous dispersion of MXene has a negative value, it can be seen that all of the MXene sheets have a negative surface charge. Meanwhile, it is shown that the zeta potential of the MXene aqueous dispersion has a negative value of less than −30 mV at pH 4 or higher, and rapidly increases in a negative direction in the range of pH 3 or higher and lower than 6, and gradually saturates at pH 6 or higher.

<MXene Fiber>

MXene fiber Preparation Examples 1 to 5

Each of MXene aqueous dispersion obtained in MXene aqueous dispersion Preparation Examples 1 to 5 was put into a plastic syringe equipped with a spinning nozzle, and was extruded into a coagulation bath containing the coagulating solution at a rate of 5 ml/h using an injection pump to form a gel fiber. The coagulating solution was a solution in which ammonium chloride was dissolved at a concentration of 1M in a mixed solvent of water and ethanol (7:3 v:v) and had pH 5. The gel fiber was collected continuously on a reel after washing with water. The fiber was dried naturally in the ambient environment of a fume hood.

MXene Fiber Comparative Example

The same method as in MXene Fiber Preparation Example 1 was performed except that the MXene aqueous dispersion obtained in MXene aqueous dispersion Comparative Example was used instead of the MXene aqueous dispersion obtained in MXene aqueous dispersion Preparation Example.

Table 3 below shows the characteristics of MXene fibers according to MXene Fiber Preparation Examples 1 to 5.

TABLE 3

|  | D.S. conc. (mg/ml) | D.S. pH | Fiber Spinning Poss. | Fiber Collection Poss. | D (Å) | Fiber Diam. (µm) | Ultimate Tensile Strength (MPa) | Tensile Strain (%) | Young's Modulus (GPa) |
| --- | --- | --- | --- | --- | --- | --- | --- | --- | --- |
| MXene Fiber C.E. | 25 | 5 | ○ | x | — | — | — | — | — |
| MXene Fiber P.E. 1 | 12 | 5 | ○ | x | — | — | — | — | — |
| MXene Fiber P.E. 2 | 15 | 5 | ○ | ○ | 14.26 | 16.5 | 36.2 ± 5.8 | 0.15 ± 0.03 | 24.5 ± 1.2 |
| MXene Fiber P.E. 3 | 20 | 5 | ○ | ○ | 13.94 | 18 | 58.3 ± 15.1 | 0.20 ± 0.02 | 25.8 ± 6.0 |
| MXene Fiber P.E. 4 | 25 | 5 | ○ | ○ | 13.9 | 18.9 | 63.9 ± 13.1 | 0.22 ± 0.05 | 29.6 ± 5.1 |
| MXene Fiber P.E. 5 | 30 | 5 | x | — | — | — | — | — | — |

Figure 7:
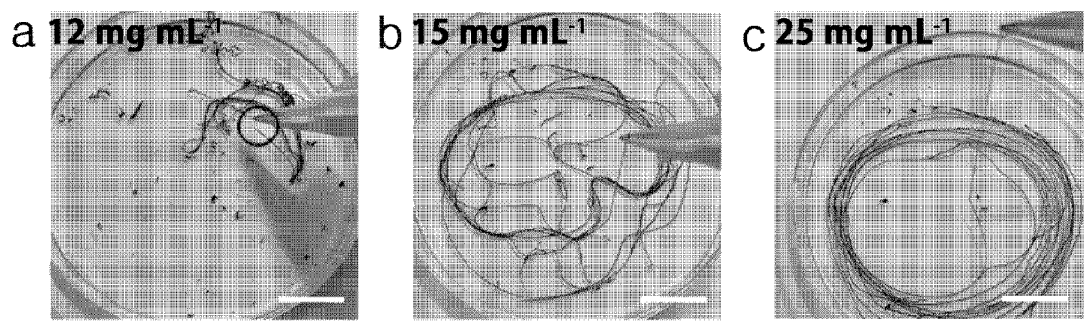
FIG. 7 shows photographs taken of collecting the gel fiber from the coagulating solution during the process of MXene fiber Preparation Examples 1, 2, and 4.

P.E.: Preparation Example
Poss.: Possibility
C.E.: Comparative Example
D: interplanar spacing
D.S.: Dope Solution
Diam.: Diameter FIG. 7 shows photographs taken of collecting the gel fiber from the coagulating solution during the process of MXene fiber Preparation Examples 1, 2, and 4. Referring to FIG. 7 and Table 1, in case that the dope solution concentration is 12 mg/ml or less (a), it is possible to spin the gel fiber from the extruder, but it is difficult to collect the gel fiber from the coagulating solution, so that it is difficult to manufacture the MXene fiber. On the other hand, when the dope solution concentration was 30 mg/ml or more (not shown), as described with reference to FIG. 5, the viscosity was too high, and it was not possible to spin the fiber from the extruder. However, it can be seen that the fibers were stably prepared when the dope solution concentration was 15 to 25 mg/ml (b, c).

Figure 8:
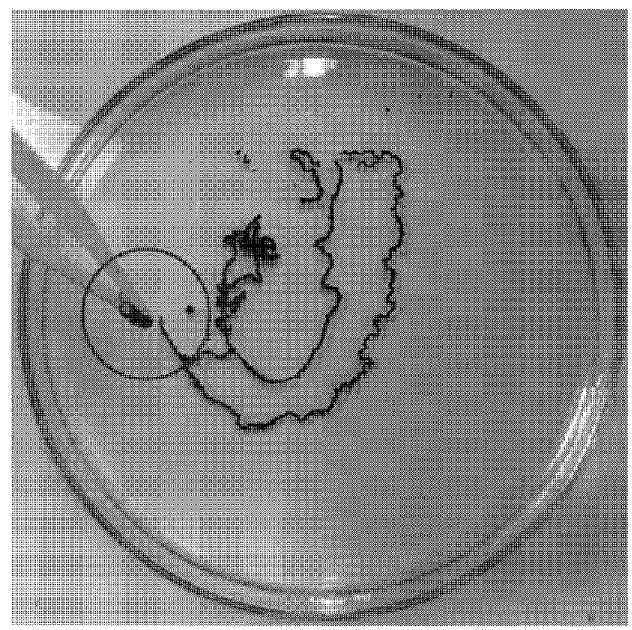
FIG. 8 shows a photograph taken of collecting the gel fiber from the coagulating solution during the process of the MXene fiber Comparative Example.

FIG. 8 shows a photograph taken of collecting the gel fiber from the coagulating solution during the process of MXene Fiber Comparative Example.

Referring to FIG. 8 and Table 1, even if the dope solution concentration is the same as that of MXene fiber Preparation Example 4, when the average size of the MXene sheet is very small, about 426 nm, it has been shown that the production of MXene fibers is difficult because the gel fibers are difficult to be collected from the coagulating solution although it is possible to spin the gel fibers from the extruder.

Figure 9:
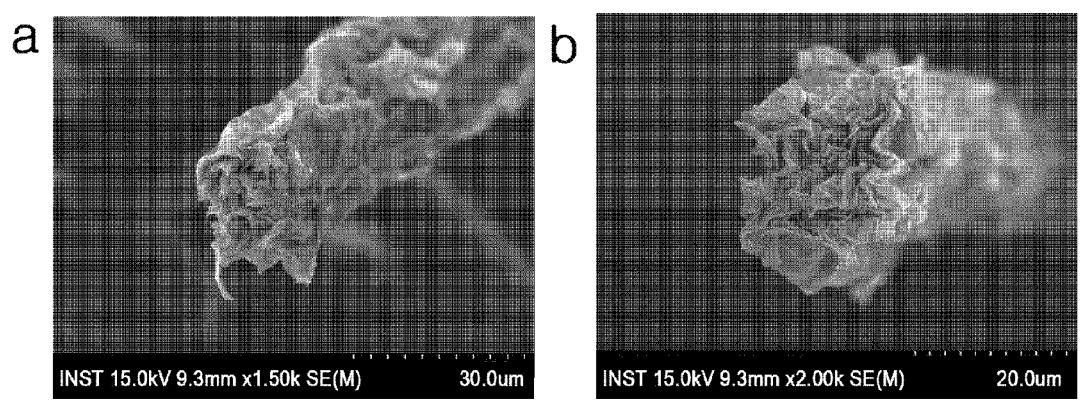
FIG. 9 shows SEM images of side (a) and cross-section (b) of the MXene fiber according to MXene fiber Preparation Example 3.

FIG. 9 shows SEM images of side (a) and cross-section (b) of MXene fiber according to MXene fiber Preparation Example 3.

Referring to FIG. 9, in the cross section of the MXene fiber according to MXene fiber Preparation Example 3, only the tortuous edge and pores between the edges were observed, not the face of the MXene sheet. Accordingly, it can be seen that a plurality of MXene sheets are stacked in the thickness direction of the fiber in a tortuous state, and the faces of the MXene sheets are oriented in the longitudinal or axial direction of the fiber. In addition, considering that the MXene fibers are not broken and have a predetermined length, it can be seen that a plurality of MXene sheets are continuously arranged in the longitudinal or axial direction of the fibers.

Figure 10:
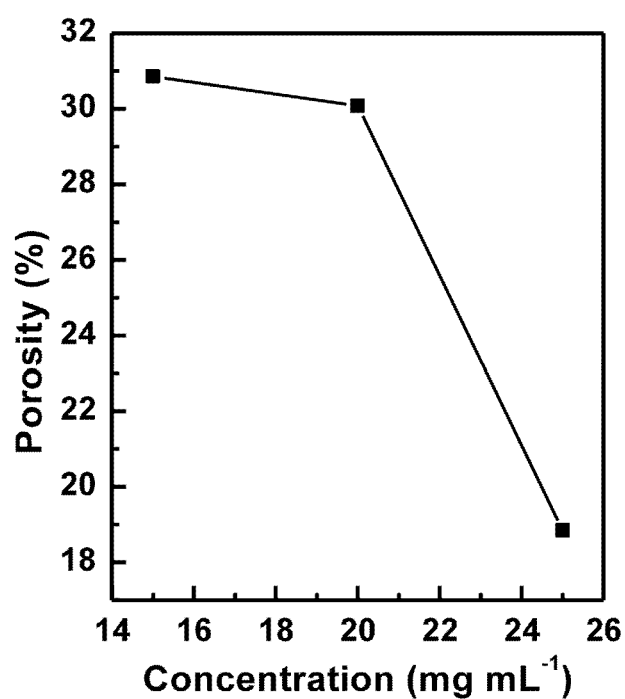
FIG. 10 is a graph showing the porosity of MXene fibers with respect to MXene dope solution concentration in relation to MXene fiber Preparation Examples 2 to 4.

FIG. 10 is a graph showing the porosity of MXene fibers with respect to MXene dope solution concentration in relation to MXene fiber Preparation Examples 2 to 4.

Referring to FIG. 10, while MXene fibers show a porosity of about 19% when the concentration of the MXene dope solution is 25 mg/ml, it can be seen that MXene fibers show a porosity of about 30% or more when the concentration of the MXene dope solution is 15 to 20 mg/ml. From this, it can be seen that the porosity of the MXene fibers is greatly reduced when the MXene dope solution concentration is 25 mg/ml compared to the case where the MXene dope solution concentration is 15 to 20 mg/ml. This was estimated to be due to the difference in viscosity of the dope solution described with reference to FIG. 5.

Figure 11:
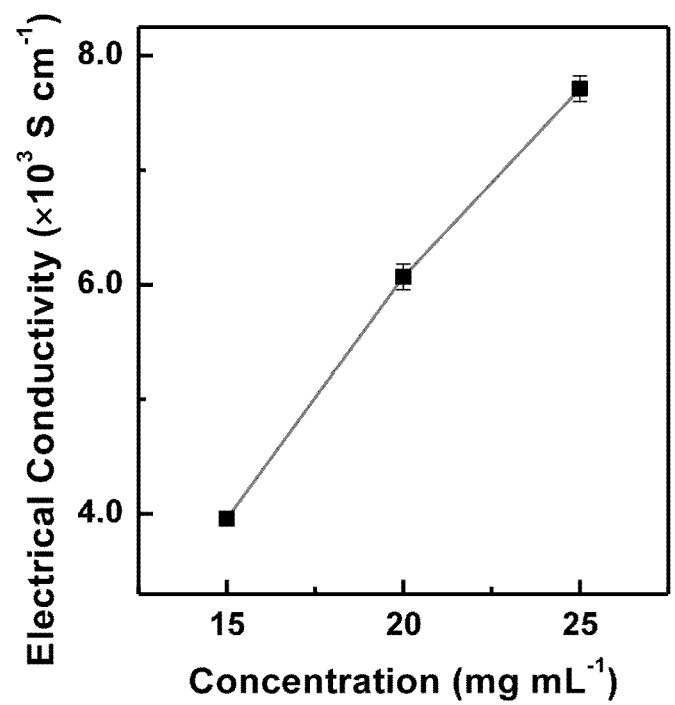
FIG. 11 is a graph showing the conductivity of MXene fibers with respect to MXene dope solution concentration in relation to MXene fiber Preparation Examples 2 to 4.

FIG. 11 is a graph showing the conductivity of MXene fibers with respect to MXene dope solution concentration in relation to MXene fiber Preparation Examples 2 to 4.

Referring to FIG. 11, it can be seen that the conductivity of the MXene fibers increases as the concentration of the MXene dope solution increases. In addition, it can be seen that the MXene fibers exhibit very good electrical conductivity compared to the conventional GO (graphene oxide) fibers formed by wet spinning or rGO (reduced graphene oxide) fibers obtained by reducing the GO fibers.

Figure 12:
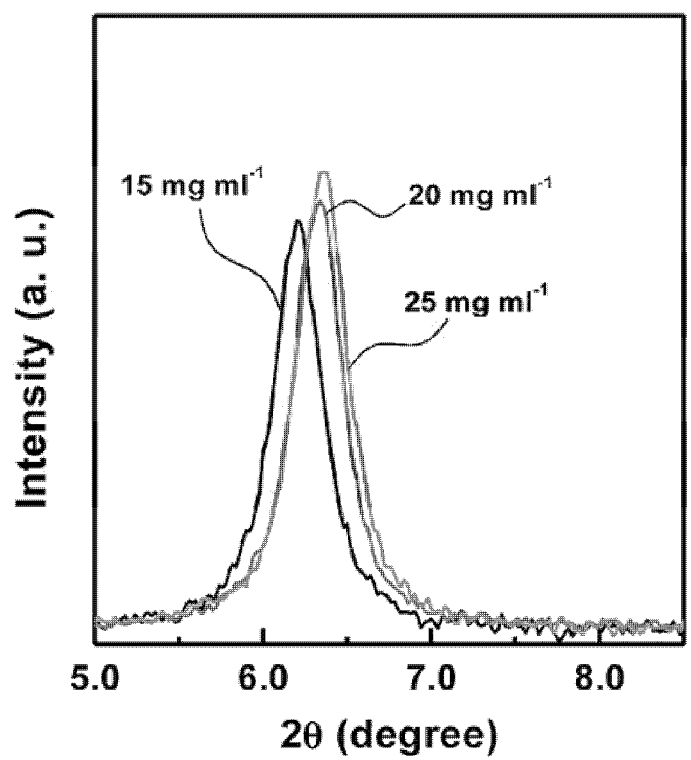
FIG. 12 shows XRD (X-Ray Diffraction) graphs of MXene fibers with respect to MXene dope solution concentration in relation to MXene fiber Preparation Examples 2 to 4.

FIG. 12 shows XRD (X-Ray Diffraction) graphs of MXene fibers with respect to MXene dope solution concentration according to MXene fiber Preparation Examples 2 to 4.

Referring to FIG. 12 and Table 3, the MXene fibers obtained from MXene Fiber Preparation Examples 2 to 4 showed peaks at 2θ of 6.2°, 6.34°, and 6.36° when the concentration of the dope solution was 15, 20, and 25 mg/ml, respectively. In addition, the interplanar distances of the MXene sheets in the MXene fiber calculated from the 2θ values of the peaks in XRD were 14.29 Å, 13.94 Å, and 13.9 Å when the concentration of the dope solution was 15, 20, and 25 mg/ml, respectively. From this, it can be seen that as the concentration of the dope solution increases, the interplanar distance between the MXene sheets in the fiber decreases.

In addition, referring to Table 3, in the MXene fibers obtained from MXene fiber Preparation Examples 2 to 4, it can be seen that the fiber cross-sectional diameter increases as the concentration of the dope solution increases to 15, 20, and 25 mg/ml.

Figure 13:
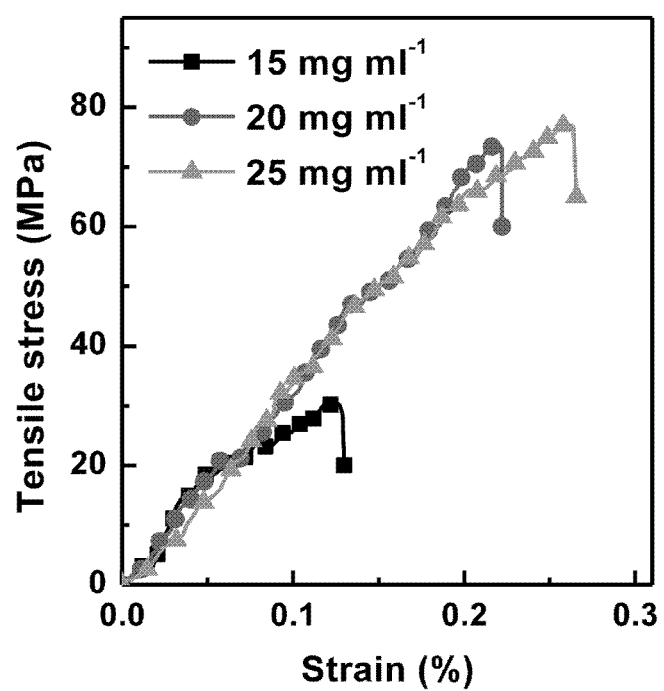
FIG. 13 is a stress-strain curve of MXene fibers according to MXene fiber Preparation Examples 2 to 4.

FIG. 13 is a stress-strain curve of MXene fibers according to MXene fiber Preparation Examples 2 to 4.

Referring to FIG. 13 and Table 3, it can be seen that the MXene fibers obtained from MXene fiber Preparation Examples 2 to 4 have improved mechanical properties such as Ultimate Tensile Strength, Tensile Strain and Young's Modulus as the concentration of the dope solution is increased to 15, 20, and 25 mg/ml.

It can be seen that the MXene fibers have improved mechanical strength as they show similar or superior Young's modulus compared to graphene oxide (GO) fibers obtained by conventional wet spinning or reduced graphene oxide (rGO) fibers obtained by reducing the GO fibers.

<Preparation of MXene Gel>

MXene Gel Preparation Example 1

The MXene aqueous dispersion obtained in MXene aqueous dispersion Preparation Example 4 was put into a coagulation bath containing the coagulating solution to prepare a gel. The coagulating solution was a solution in which ammonium chloride was dissolved at a concentration of 1M in a mixed solvent of water and ethanol (7:3 v:v), and had a pH of 5.

MXene Gel Preparation Example 2

The MXene aqueous dispersion obtained in MXene aqueous dispersion Preparation Example 4 was put into a coagulation bath containing the coagulating solution to prepare a gel. The coagulating solution had an ammonium chloride concentration of 1M in a mixed solvent of water and ethanol (7:3 v:v), and had a pH of 9 by adding aqueous ammonia (28 wt %) as a pH adjuster.

Figure 14:
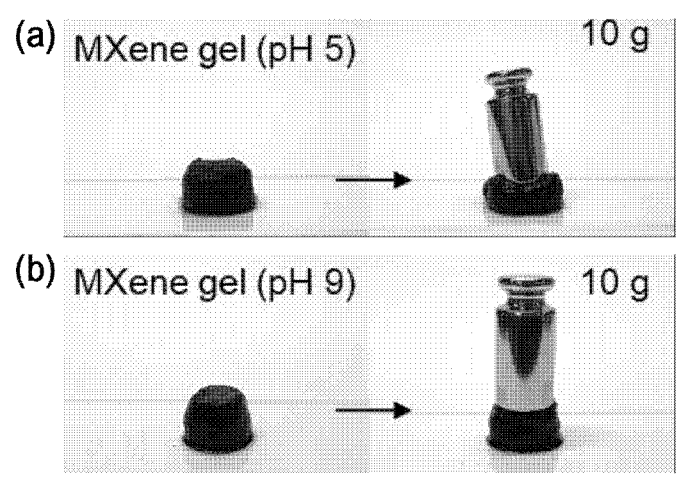
FIG. 14 shows photographs showing the strength of MXene gels according to MXene gel Preparation Example 1 and MXene gel Preparation Example 2.

FIG. 14 shows photographs showing the strength of MXene gels according to MXene gel Preparation Example 1 and MXene gel Preparation Example 2.

According to FIG. 14, compared to when the pH of the coagulation solution is 5 (MXene gel Preparation Example 1), when the pH of the coagulation solution is 9 (MXene gel Preparation Example 2), the strength of the obtained gel is increased considering that the gel shows little deformation when a weight of 10 g is placed. As shown in FIG. 6, it can be presumed that, since the amount of negative charge on the surface of MXene was larger when the pH was 9 compared to when the pH was 5, the electrostatic interaction between the surface of MXene and ammonium ions, which are cations in the coagulating solution, increased to form a gel with a larger strength.

Figure 15:
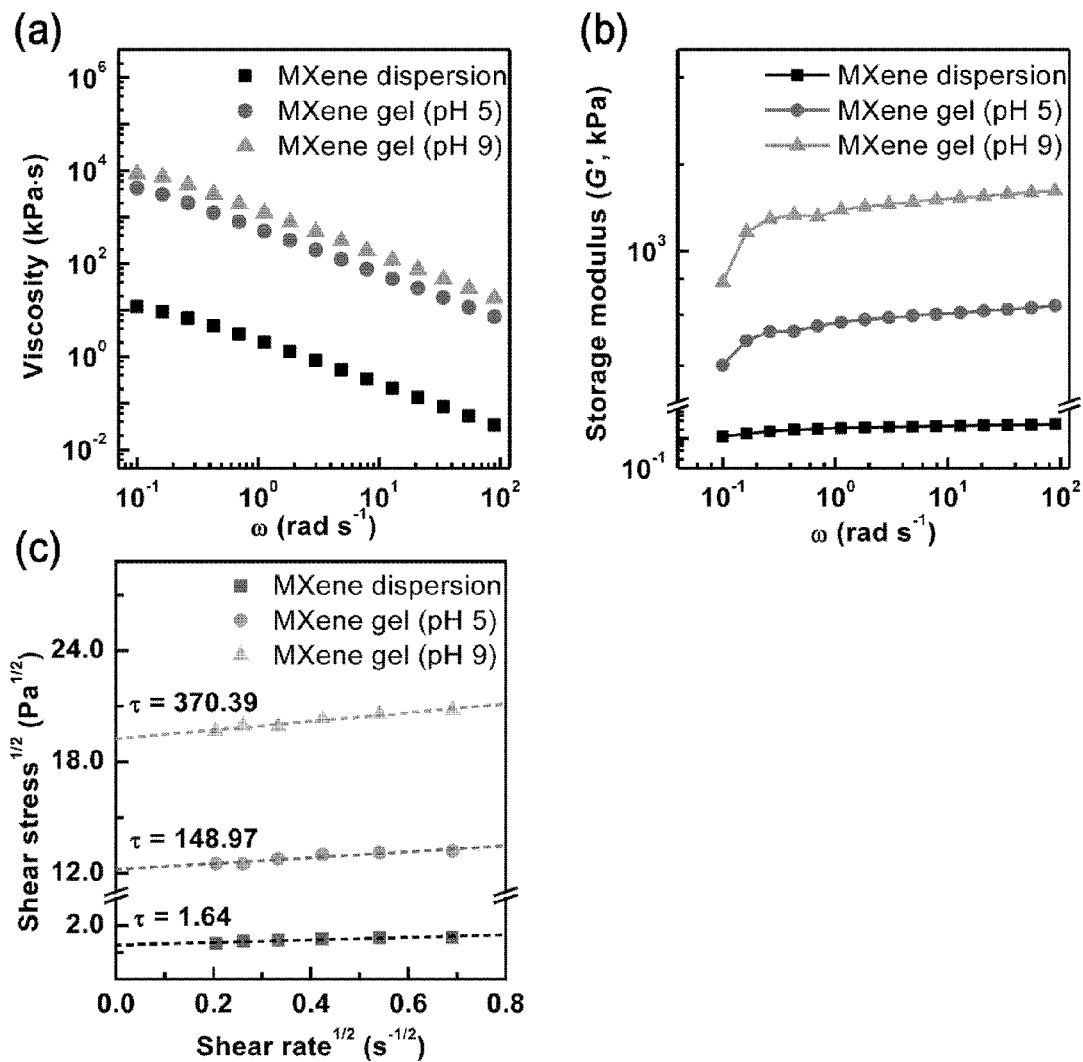
FIG. 15 shows graphs displaying the rheological properties of MXene aqueous dispersion obtained from MXene aqueous dispersion Preparation Example 4, MXene gel (pH 5) according to MXene gel Preparation Example 1, and MXene gel (pH 9) according to MXene gel Preparation Example 2.

FIG. 15 shows graphs displaying the rheological properties of MXene aqueous dispersion obtained from MXene aqueous dispersion Preparation Example 4, MXene gel (pH 5) according to MXene gel Preparation Example 1, and MXene gel (pH 9) according to MXene gel Preparation Example 2. Specifically, (a) shows the viscosity of the sample with respect to angular velocity, (b) shows the storage modulus with respect to angular velocity, and (c) shows the yield stress calculated through Casson's plot.

Referring to FIG. 15, compared to the MXene aqueous dispersion and the MXene gel (pH 5) according to MXene gel Preparation Example 1, the MXene gel (pH 9) according to MXene gel Preparation Example 2 shows higher viscosity, higher storage modulus, and higher shear stress in the analyzed range. It was understood that this was because the MXene sheets were densely assembled using the basic coagulant. Specifically, it was understood that when the pH of the coagulant was basic, the electrostatic interaction between the coagulant cation and the MXene sheets was improved, and the strength was further improved as the MXene sheets were more densely assembled.

<Preparation and Stretching of MXene Fiber Using Alkali Coagulating Solution>

MXene Fiber Preparation Example 6

MXene fibers were prepared in the same manner as described in MXene Fiber Preparation Example 4, except that the extruded gel fibers in the coagulation bath were drawn with draw ratio of 2.

MXene Fiber Preparation Example 7

The MXene aqueous dispersion obtained from MXene aqueous dispersion Preparation Example 4 was put into a plastic syringe equipped with a spinning nozzle, and extruded into a coagulation bath containing the coagulating solution at a rate of 5 ml/h using an injection pump to produce gel fibers. The coagulating solution was a solution in which ammonium chloride was dissolved at a concentration of 1M in a mixed solvent of water and ethanol (7:3 v:v), and exhibited pH 9 by adding an aqueous ammonia solution (28 wt %) as a pH adjuster. Gel fibers were collected continuously on a reel after washing with water. The fibers were dried naturally in the ambient environment of a fume hood.

MXene Fiber Preparation Example 8

MXene fibers were prepared in the same manner as described in MXene Fiber Preparation Example 7, except that the extruded gel fibers in the coagulation bath were drawn with draw ratio of 2.

MXene Fiber Preparation Example 9

MXene fibers were prepared in the same manner as described in MXene Fiber Preparation Example 7, except that the extruded gel fibers in the coagulation bath were drawn with draw ratio of 3.

MXene Fiber Production Example 10

MXene fibers were prepared in the same manner as described in MXene Fiber Preparation Example 7, except that the extruded gel fibers in the coagulation bath were drawn with draw ratio of 4.

Figure 16:
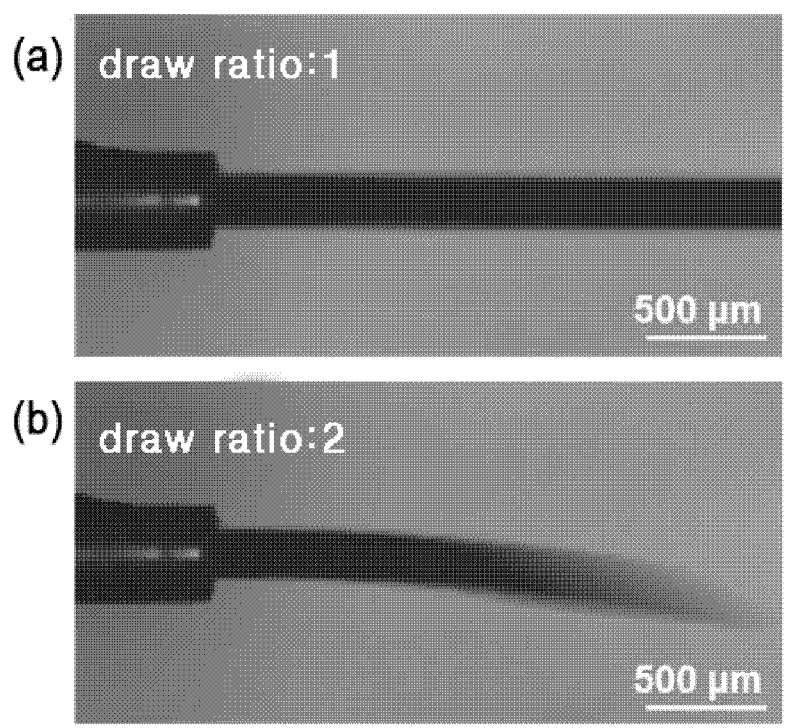
FIG. 16 shows photographs of gel fibers extruded from a nozzle in a coagulation bath during the progress of MXene fiber Preparation Example 4 (a, draw ratio: 1) and MXene fiber Preparation Example 6 (b, draw ratio: 2).

FIG. 16 shows photographs of gel fibers extruded from a nozzle in a coagulation bath during the progress of MXene fiber Preparation Example 4 (a, draw ratio: 1) and MXene fiber Preparation Example 6 (b, draw ratio: 2).

Referring to FIG. 16, when the pH of the coagulating solution in the coagulation bath is 5, it can be seen that the gel fiber is broken when stretched with draw ratio of 2 or more.

Figure 17:
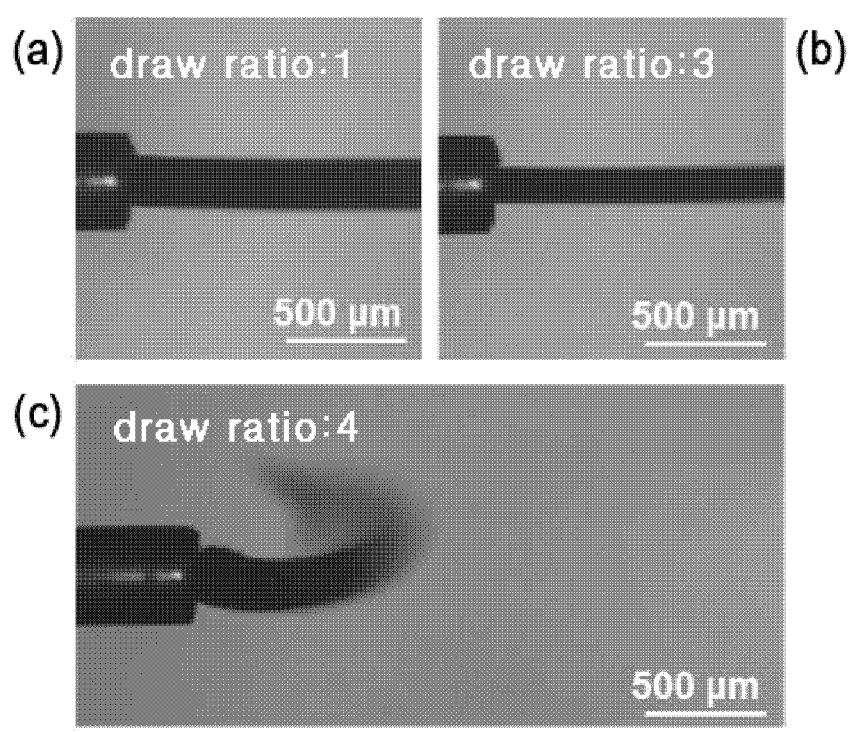
FIG. 17 shows photographs of gel fibers extruded from a nozzle in a coagulation bath during the progress of MXene fiber Preparation Example 7 (a, draw ratio: 1), MXene fiber Preparation Example 9 (b, draw ratio: 3), and MXene fiber Preparation Example 10 (b, draw ratio: 4).

FIG. 17 shows photographs of gel fibers extruded from a nozzle in a coagulation bath during the progress of MXene fiber Preparation Example 7 (a, draw ratio: 1), MXene fiber Preparation Example 9 (b, draw ratio: 3), and MXene fiber Preparation Example 10 (b, draw ratio: 4).

Referring to FIG. 17, when the pH of the coagulating solution in the coagulation bath is 9, it can be seen that the gel fiber is not broken when stretched with draw ratio of 3 (b), but is broken when stretched with draw ratio of 4 or more (c).

Figure 18:
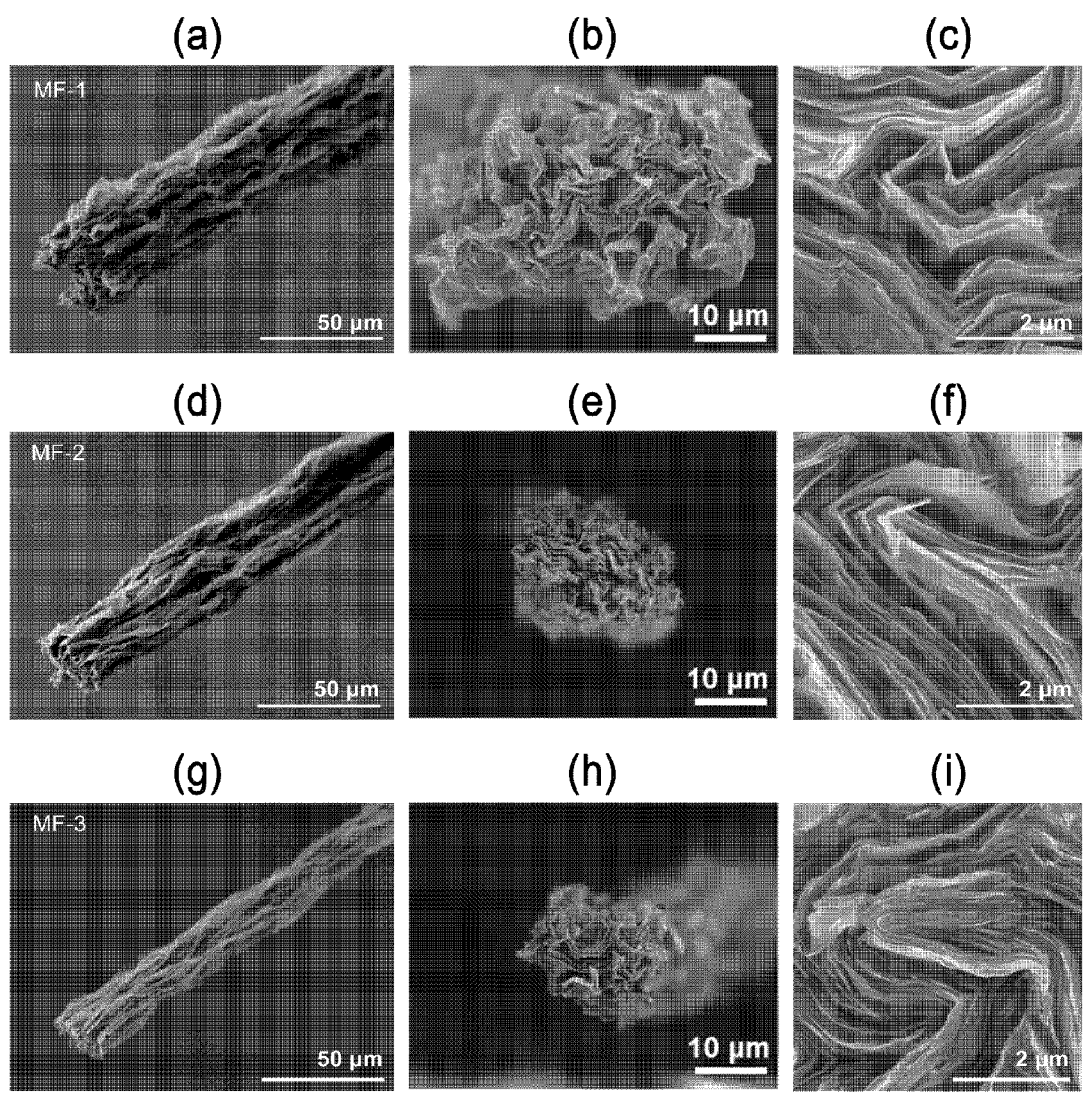
FIG. 18 shows SEM images of cross-sections of MXene fibers according to MXene fiber Preparation Examples 7 to 9.

FIG. 18 shows SEM images of cross-sections of MXene fibers according to MXene fiber Preparation Examples 7 to 9. Specifically, a side surface (a), a cross-section (b), and an enlarged cross-section (c) of MXene fibers when the draw ratio is 1 as in MXene fiber Preparation Example 7, a side surface (d), a cross-section (e), and an enlarged cross-section (f) of MXene fibers when the draw ratio is 2 as in MXene fiber Preparation Example 8, and a side surface (g), a cross-section (h), and an enlarged cross-section (i) when the draw ratio is 3 as in MXene fiber Preparation Example 9 are shown.

Referring to FIG. 18, as the draw ratios are increased to 1, 2, and 3 as in MXene fiber Preparation Examples 7 to 9, it can be seen that the density of the lamellar structure observed in the cross section of the fiber increases, and the fiber diameter decreases.

Figure 19:
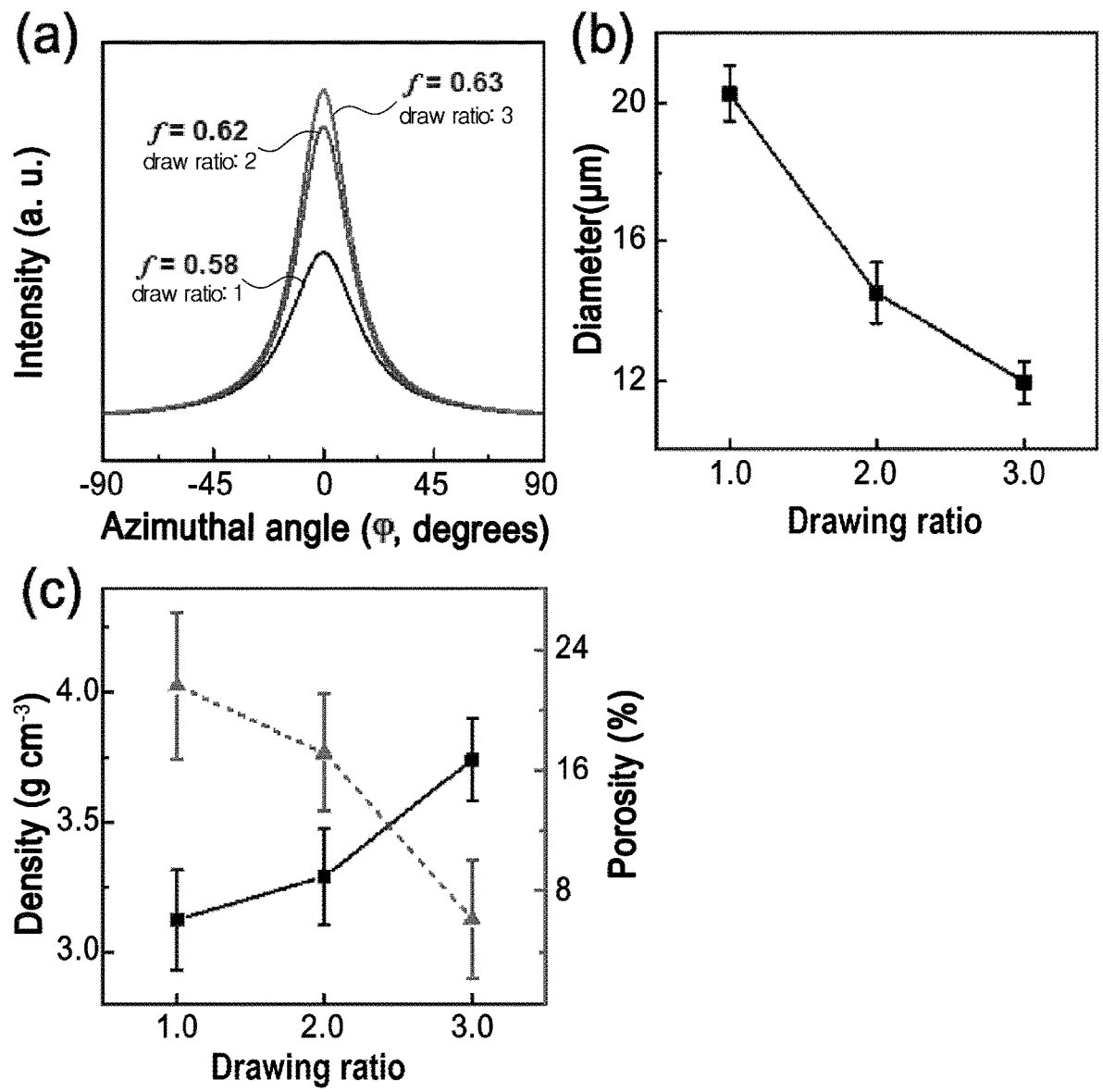
FIG. 19 displays graphs showing the degree of orientation (a), diameter (b), and density and porosity (c) of MXene fibers according to MXene fiber Preparation Examples 7 to 9.

FIG. 19 displays graphs showing the degree of orientation (a), diameter (b), and density and porosity (c) of MXene fibers according to MXene fiber Preparation Examples 7 to 9. Here, the degree of orientation was calculated using Herman's orientation function from the X-ray diffraction intensity graph according to the azimuthal angle.

Referring to (a) of FIG. 19, the degree of orientation increased as the draw ratio increased. The degree of orientation f may have a value of 0.5 to 0.7. However, it can be understood that the increase in the degree of orientation is saturated when the draw ratio is 2 or more, considering that the amount of increase in the degree of orientation when the draw ratio is increased from 1 to 2 compared to the amount of increase in the degree of orientation when the draw ratio is increased from 2 to 3 is large. Therefore, it may be preferable that the draw ratio is 2 or more and the degree of orientation (f) is 0.6 or more.

Referring to (b) of FIG. 19, the diameter of the fiber decreased as the draw ratio increased, and it was shown that the diameter was saturated at a draw ratio of 2 or more. Therefore, it may be preferable that the draw ratio is 2 or more and the diameter is less than about 20 μm, specifically about 15 μm or less, and about 10 μm or more, specifically about 11 μm or more.

Referring to (c) of FIG. 19, as the draw ratio increases, the fiber density increases and the porosity increases. The density of the fibers may be about 3 to 4 g/cm, specifically about 3.1 to 3.8 g/cm, more specifically about 3.7 to 3.8 g/cm. The porosity of the fibers may be about 4 to 24%, specifically about 5 to 20%, more specifically about 6 to 8%.

Figure 20:
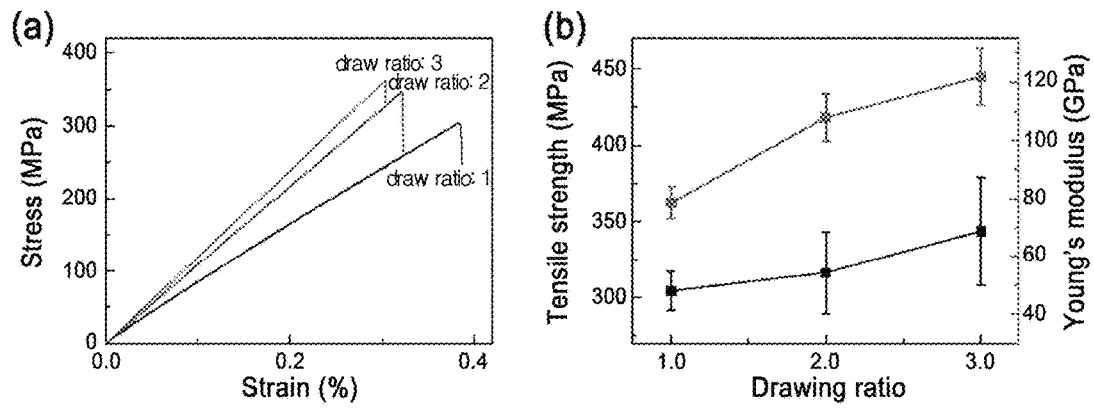
FIG. 20 shows a stress-strain curve (a) and a graph of tensile strength and Young's modulus according to draw ratio (b) of MXene fibers obtained from MXene fiber Preparation Examples 7 to 9.

FIG. 20 shows a stress-strain curve (a) and a graph of tensile strength and Young's modulus (b) according to draw ratio of MXene fibers obtained from MXene fiber Preparation Examples 7 to 9.

Referring to FIG. 20, it can be seen that the tensile strength and Young's modulus increase as the draw ratio increases. The tensile strength may be about 300 to 350 MPa, specifically about 320 to 350 MPa. The Young's modulus may be about 80 to 130 GPa, specifically 100 to 125 GPa.

Figure 21:
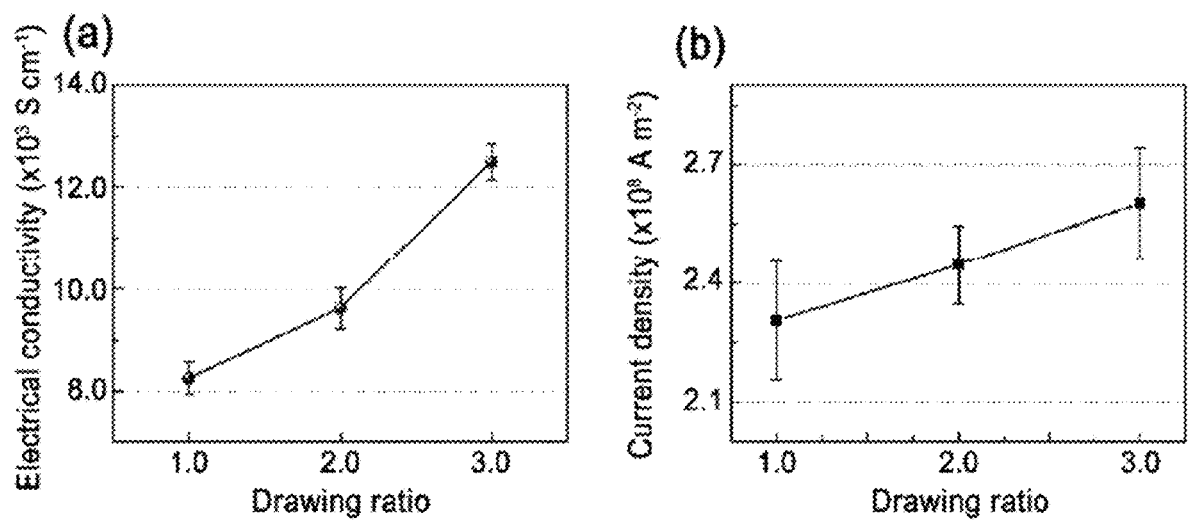
FIG. 21 shows the electrical conductivity (a) and the maximum allowable current density (b) according to the draw ratio of the MXene fibers obtained from MXene fiber Preparation Examples 7 to 9.

FIG. 21 shows electrical conductivity (a) and maximum allowable current density (b) according to the draw ratio of the MXene fibers obtained from MXene fiber Preparation Examples 7 to 9.

Referring to FIG. 21, it can be seen that as the draw ratio increases, the electrical conductivity flowing through the fibers along the axial direction increases and the maximum allowable current density also increases. The electrical conductivity is about $8 \times 10^3$ to $13 \times 10^3$ S/cm, specifically, about $12.5 \times 10^3$ S/cm or more, and the maximum allowable current density is about $2.2 \times 10^8$ to $2.7 \times 10^8$ A/m$^2$, specifically, about $2.4 \times 10^8$ to $2.6 \times 10^8$ A/m$^2$.

<MXene Fiber Heat Treatment>

MXene Fiber Preparation Example 11

The doubly stretched MXene fiber obtained in MXene Fiber Preparation Example 8 was heat-treated at 250° C. in an argon atmosphere to obtain a heat-treated MXene fiber.

MXene Fiber Preparation Example 12

The doubly stretched MXene fiber obtained in MXene Fiber Preparation Example 8 was heat-treated at 500° C. in an argon atmosphere to obtain a heat-treated MXene fiber.

MXene Fiber Preparation Example 13

The doubly stretched MXene fiber obtained in MXene Fiber Preparation Example 8 was heat-treated at 750° C. in an argon atmosphere to obtain a heat-treated MXene fiber.

Figure 22:
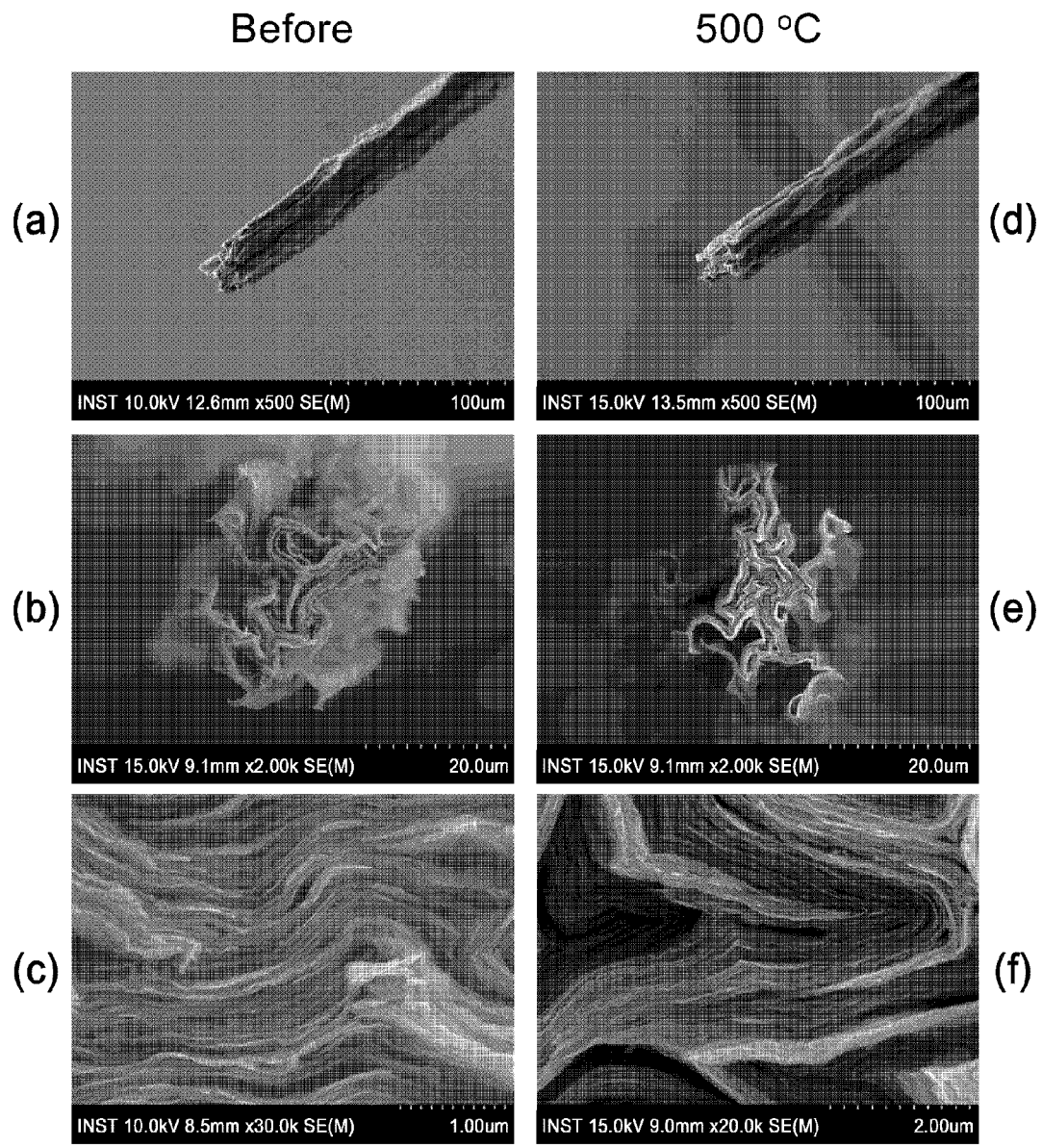
FIG. 22 displays SEM images showing a side (a), a cross-section (b), and an enlarged cross-section (c) of the fiber obtained from MXene fiber Preparation Example 8 and a side (d), a cross-section (e), and an enlarged cross-section (f) of the fiber obtained from MXene fiber Preparation Example 11.

FIG. 22 displays SEM images showing a side (a), a cross-section (b), and an enlarged cross-section (c) of the fiber obtained from MXene fiber Preparation Example 8 and a side (d), a cross-section (e), and an enlarged cross-section (f) of the fiber obtained from MXene fiber Preparation Example 11.

Referring to FIG. 22, it can be seen that the cross-sectional area of the MXene fiber is not significantly changed by heat treatment, but the distance between the MXene sheets in the MXene fiber is greatly reduced.

Figure 23:
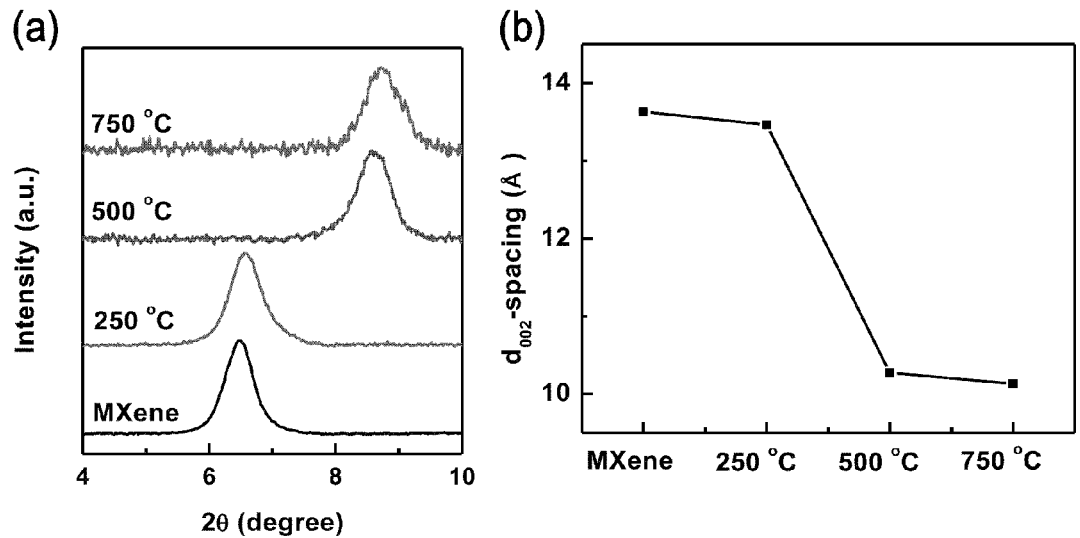
FIG. 23 shows the XRD patterns (a) and the spacing between MXene sheets (b) of fibers obtained from MXene fiber Preparation Examples 8, 11, 12, and 13.

FIG. 23 shows the XRD patterns (a) and the spacing between MXene sheets (b) of fibers obtained in MXene fiber Preparation Examples 8, 11, 12, and 13.

Referring to FIG. 23, compared to the non-heat-treated MXene fiber (MXene fiber Preparation Example 8), it can be seen that the MXene fiber heat-treated at 250 degrees (MXene fiber Preparation Example 11) did not show a change in the XRD peak and a significant difference in the spacing ($d_{002}$-spacing) between the MXene sheets, but the MXene fiber heat-treated at 500 degrees or more (MXene fiber Preparation Examples 12 and 13) shows a significant change in the center of the XRD peak from 8 to 9 degrees ($2\theta$) and a spacing between MXene sheets ($d_{002}$-spacing) greatly reduced to 10 to 11 Å. This was presumed to be due to the removal of water molecules and/or functional groups between the MXene sheets, and it was presumed that the conductivity was improved as electron exchange between the sheets was facilitated due to the narrow gap between the MXene sheets.

Figure 24:
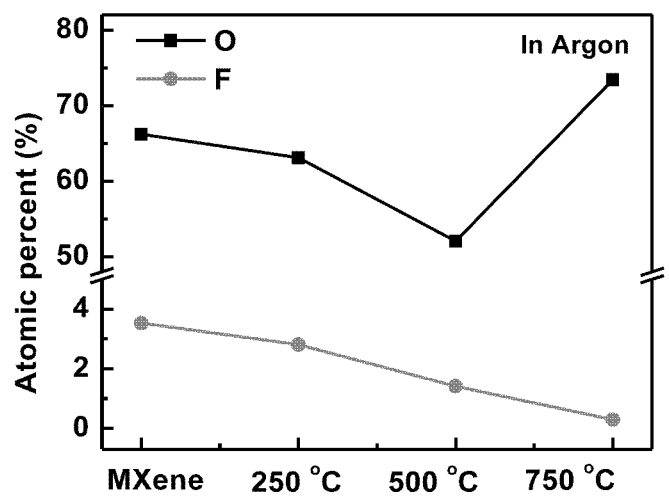
FIG. 24 is a graph showing the content of surface functional groups of fibers obtained from MXene fiber Preparation Examples 8, 11, 12, and 13.

FIG. 24 is a graph showing the content of surface functional groups of fibers obtained in MXene fiber Preparation Examples 8, 11, 12, and 13.

Referring to FIG. 24, among the surface functional groups of the fibers obtained in MXene fiber Preparation Examples 8, 11, 12, and 13, oxygen is derived from —O or —OH on the surface, and fluorine is derived from —F. The content of functional groups on the MXene surface was found to be affected by the heat treatment temperature, and specifically, fluorine was estimated to be removed by heat treatment as it appeared to decrease with the increase of the heat treatment temperature. On the other hand, oxygen decreased until the heat treatment temperature reached 500° C., and then increased again at 750° C. It is estimated that this is because $TiO_2$ crystals grow at a high temperature of 750° C. In the case of heat treatment at 500 degrees (MXene fiber Preparation Example 12), oxygen was found to be contained in an amount of 50 to 60 at %, specifically, 50 to 55 at %.

Figure 25:
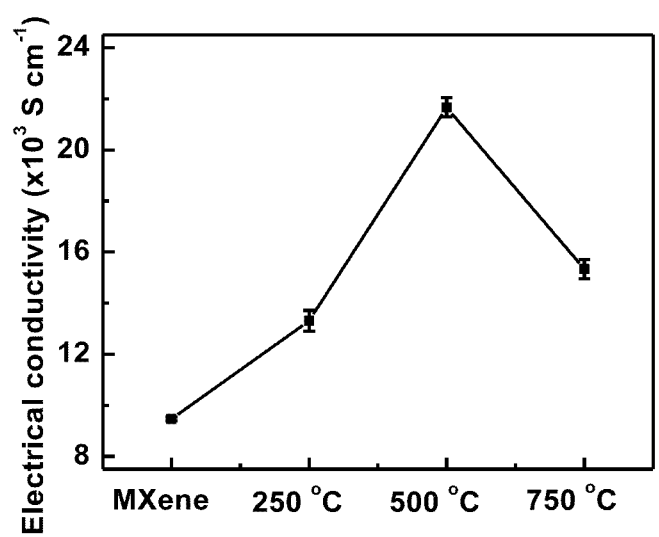
FIG. 25 is a graph showing the electrical conductivity of fibers obtained from MXene fiber Preparation Examples 8, 11, 12, and 13.

FIG. 25 is a graph showing the electrical conductivity of fibers obtained in MXene fiber Preparation Examples 8, 11, 12, and 13.

Referring to FIG. 25, it was found that the highest electrical conductivity was exhibited when the heat treatment temperature was 500 degrees. In this case, the electrical conductivity was 20,000 S/cm or more, specifically 22,000 S/cm. As described with reference to FIG. 24, it was understood that the conductivity was improved because the surface functional groups of the MXene sheets were removed by heat treatment; however, in the case of heat treatment at 750° C., it was estimated that the conductivity decreased because $TiO_2$ crystals, a metal oxide with relatively low conductivity, were grown.

In the above, the present invention has been described in detail with reference to the exemplary embodiments, but the present invention is not limited to the above embodiments, and various modifications and changes by those skilled in the art are possible within the spirit and scope of the present invention

The invention claimed is:

1. An MXene fiber comprising:
   MXene sheets,
   wherein the MXene sheets are laminated in a tortuous state in the thickness direction of the MXene fiber, respective faces of the MXene sheets are oriented in a longitudinal or axial direction of the MXene fiber, and the MXene sheets are continuous in the longitudinal or axial direction of the MXene fiber,
   wherein the MXene sheets are two-dimensional material sheets,
   wherein the Young's modulus of the MXene fiber is 10 to 200 GPa, and wherein an electrical conductivity of the MXene fiber is 2000 to 25.000 S/cm.

2. The MXene fiber of claim 1, wherein an interplanar distance between the MXene sheets in the MXene fiber is 10 to 20 Å.

3. The MXene fiber of claim 1, wherein a center of a peak obtained on an XRD graph for the MXene fiber represents a value of $2\theta$ of 6 to 9°.

4. The MXene fiber of claim 1, wherein the diameter of the MXene fibers is micrometer size.

5. A method for manufacturing the MXene fiber of claim 1, the method comprising:
   preparing a dope solution in which MXene sheets are dispersed in a polar solvent;
   extruding the dope solution into a coagulating solution to coagulate the extruded dope solution to change into an MXene gel fiber; and
   drying the MXene gel fiber and converting it into the MXene fiber,
   wherein the MXene fiber comprises the MXene sheets which are two-dimensional material sheets, and
   wherein the MXene sheets are laminated in a tortuous state in the thickness direction of the MXene fiber, respective faces of the MXene sheets are oriented in a longitudinal or axial direction of the MXene fiber, the MXene sheets are continuous in the longitudinal or axial direction of the MXene fiber, and the Young's modulus of the MXene fiber is 10 to 200 GPa.

6. The method of claim 5, wherein the MXene sheets have an average area of several $\mu m^2$.

7. The method of claim 5, wherein each of the MXene sheets is a transition metal carbide or transition metal nitride sheet to which at least one terminal group selected from the group consisting of F, OH, and O is bonded on the surface.

8. The method of claim 5, wherein the coagulating solution is a solution containing a cation as a coagulant.

9. The method of claim 8, wherein the cation is $Li^+$, $Na^+$, $K^+$, $Mg^{2+}$, $Ca^{2+}$, $Cu^{2+}$, $Co^{2+}$, $Al^{3+}$, or $Fe^{3+}$.

10. The method of claim 8, wherein the cation is an ammonium ion.

11. The method of claim 8, wherein the coagulating solution contains water, alcohol, or a mixed solvent of water and alcohol.

12. The method of claim 8, wherein each of the MXene sheets is a sheet on which at least one surface functional group selected from the group consisting of F, OH, and O is bonded on the surface, and the cation electrostatically binds the surface functional groups of the MXene sheets in the MXene gel fiber to form a cross-linkage between the MXene sheets.

13. The method of claim 5, wherein the coagulating solution is basic.

14. The method of claim 13, further comprising stretching the MXene gel fiber 2-3 times before drying the MXene gel fiber.

15. The method of claim 5, further comprising heat-treating the MXene fiber in an inert gas atmosphere.

16. The method of claim 15, wherein the heat treatment is performed at 400 to 600° C.

* * * * *